USOO5099965A

United States Patent [19]
Lehnert et al.

[11] Patent Number: 5,099,965
[45] Date of Patent: Mar. 31, 1992

[54] RAIL BRAKING ACTUATION DEVICE

[75] Inventors: Erhard Lehnert, Uetze/Dollbergen; Manfred Windel, Hanover, both of Fed. Rep. of Germany

[73] Assignee: WABCO Westinghouse Steuerungstechnik GmbH & Co., Hanover, Fed. Rep. of Germany

[21] Appl. No.: 561,863

[22] Filed: Aug. 1, 1990

[30] Foreign Application Priority Data

Aug. 3, 1989 [DE] Fed. Rep. of Germany ....... 3925700

[51] Int. Cl.$^5$ .......................... B60T 13/04; B60T 13/10
[52] U.S. Cl. ................... 188/170; 92/130 A; 188/72.6; 188/106 F; 192/91 R
[58] Field of Search ................ 188/72.6, 72.9, 153 A, 188/153 R, 153 D, 106 F, 170; 192/91 R; 92/130 A

[56] References Cited

U.S. PATENT DOCUMENTS 3,876,043  4/1925  Frania et al. ................... 188/153 A
4,649,804  3/1987  Oberlander ....................... 92/130 A

FOREIGN PATENT DOCUMENTS 1605177  11/1974  Fed. Rep. of Germany.
2026545  4/1976  Fed. Rep. of Germany.

Primary Examiner—George E. A. Halvosa
Attorney, Agent, or Firm—Buchanan Ingersoll; George Patrick Baier

[57] ABSTRACT

The invention concerns a braking device with a piston that can be acted upon by a pressure medium from a pressure medium chamber against the force of a actuation spring. The piston is connected through an actuation arm with a brake linkage. In order to reduce the dimensions of the braking device, the actuation spring and the actuation arm are parallel and coaxial to each other, such that the actuation spring and the actuation arm are located between the moment arms of the brake linkage.

12 Claims, 3 Drawing Sheets

RAIL BRAKING ACTUATION DEVICE

BACKGROUND OF THE INVENTION

1. Field of the Invention

The present invention relates to a braking device for rail vehicles. More specifically, the invention relates to a compact actuator for a disc-type brake.

2. Description of the Prior Art

The prior art device is illustrated in Federal Republic of Germany Patent No. 20 26 545. This device is further illustrated in FIG. 1. An understanding of the operation of the prior art device is obtained with reference to FIG. 1. FIG. 2, while illustrating the improved device, shows in additional the basic operation of disc-type brakes with regard to the application of the pads to the wheel or disc rotor. As seen in FIG. 2, a disc-brake actuator is utilized for applying pressure, through two disc-brake pads, to the opposite sides of a revolving wheel or rotor. The disc-brake actuator operates by outward lateral movement of an actuator 21 (as shown in FIG. 2) by moment arm 25, which displaces first lever arm 20 outwardly from the valve housing 5. As the distance between pivots 7 and 22 increases, and the distance between pivots 9 and 16 is held constant by connecting rod 15, pads 13 and 11 are forced against wheel 12.

Referring to FIG. 1, an actuator is disclosed which can be both spring applied-air release and air applied-spring release. The release of the brake is produced by a moment arm 125, corresponding to moment arm 25 of the improved device, urged in a leftmost, non-braking direction by spring 100. The corresponding air application of the service brake is provided by pressurization of chamber 104, when air is introduced to chamber 104, piston 106 is moved rightwardly, as shown in FIG. 1, moving moment arm 125 into the actuated position.

The spring applied-air release function is performed by spring 131, piston 115 and chamber 105. Pressure is maintained in chamber 105 while braking is not required. When spring actuated braking is desired, pressure is relived from chamber 105 through port 110. This allows piston 115 to move rightwardly, as shown in FIG. 1 as urged by spring 131. This draws transfer arm 120 and flange 130 rightwardly, which in turn moves moment arm 125 rightwardly, engaging the brake. As is quickly discerned from FIG. 1, a supplemental housing 135 is necessary to contain the mechanism of the actuator.

This braking device therefore requires a relatively large space for the actuation elements, as a result of which the entire braking device is relatively large. What is lacking in the art, therefore, is a braking device of the above type, which has a smaller construction compared with the above-described braking device.

SUMMARY OF THE INVENTION

An actuation device is disclosed for use with a disc-brake system which requires minimum additional space for accommodating the actuation element. This allows for smaller construction of the braking device as a whole. This space savings is achieved by arranging the actuation spring and the line of movement of the transfer mechanism parallel and coaxial to each other. If the actuation spring is placed between two moment arms when two of them are present, the bearing points for the two moment arms are arranged crosswise to the longitudinal axis of the actuation spring.

The actuation arm is, according to the preferred embodiment of the device, pivotably connected with a tubular body that at least partially surrounds the actuation spring. The pivot points for a moment arm or arms of the brake linkage are arranged on the outer shell of the tubular body. The tubular body at least partially surrounds a second tubular body mounted coaxially therein. The second tubular body preferably has a stop on one end facing a first piston which provides the spring applied-air release function of the emergency brake. These two elements work together in conjunction with a travel-limiting device associated with the first piston, such that when there is a movement of the actuation piston in the direction for actuation of the brake, the actuation arm is entrained by the actuation piston in the direction of brake actuation.

In the preferred embodiment of the device, an additional piston preferably provides the air applied-spring release function of the service brake. This second piston acts together with the actuation arm directly or indirectly. A centrally arranged elongated member is preferably provided on the second piston. The elongated member projects into the additional tubular body and can be brought to rest on a stop of the additional tubular body. This permits the actuation arm to be entrained by the second piston when there is a movement of the second piston in the direction of braking.

The actuation piston can be connected with the second piston directly via a trailing connection, so that when there is a movement of the actuation piston in the direction of brake actuation the second piston is entrained by the actuation piston through the trailing connection. This occurs when the second piston or a component connected with the second piston comes to rest on the actuation arm and the latter is entrained by the second piston in the direction of movement of the spring-loaded piston. A traction element may optionally serve as the trailing connection which connects either the actuation piston with the actuation arm or the actuation piston with the second piston.

These and other advantages and features of the present invention will be more fully understood with reference to the presently preferred embodiments thereof and to the appended drawings.

DESCRIPTION OF THE PREFERRED EMBODIMENTS

Figure 2:
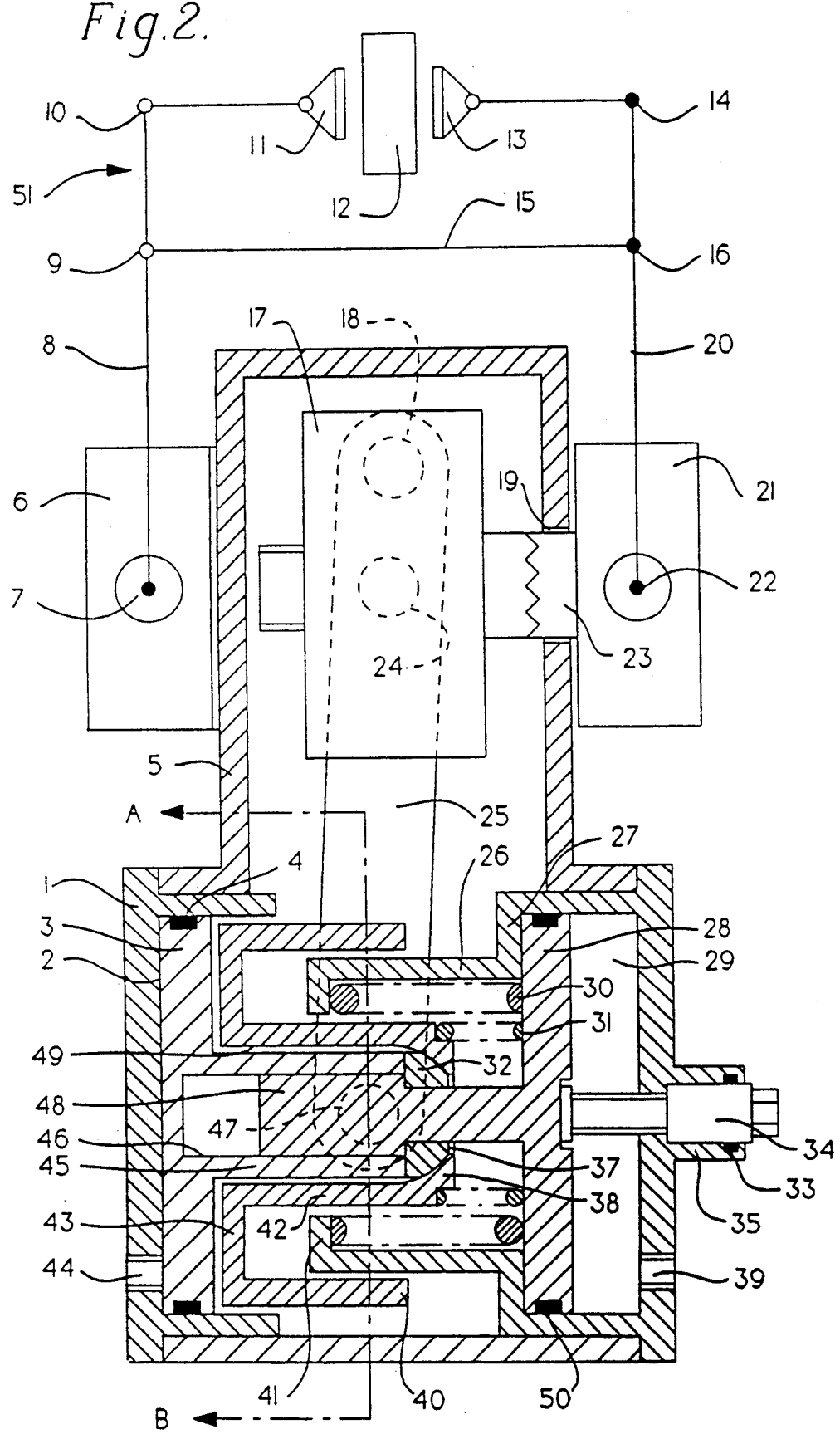
FIG. 2 is a sectional view of an improved actuation device as described herein.

A braking device that has a spring applied-air release actuator and an air applied-spring release actuator is shown in FIG. 2. The spring-applied brake cylinder has a first piston 28 situated displaceably in a first housing section 1, sealed with a sealing ring 50. This spring applied brake could be used in a typical parking brake application on a vehicle. The actuation piston 28 limits a pressure medium chamber 29. The pressurized fluid medium chamber 29 can be connected through a pressure medium connection 39 and a valve device (not shown) optionally with a pressure medium source or with the atmosphere or with a return line. While the present preferred embodiments described herein contemplate the use of air as the pressurized fluid medium, hydraulic oil or other fluids may be utilized in conjunction with the device.

An additional piston that serves as the second piston 3, sealed with a sealing ring 4, is displaceably installed coaxially to the actuation piston 28 and opposite the latter in the first housing section 1. The second piston 3 limits another pressure medium chamber 2, which can be connected through in additional pressure medium connection 44 and a valve device (not shown) optionally with a pressure medium source, with the atmosphere or with a return line. The second piston 3 provides the air applied-spring release function of the actuator, typical of the service braking of a vehicle.

On its side facing away from the other pressure medium chamber 2, the second piston 3 has a centrally situated tubular elongated member 45 extending into the inner space of the housing.

An actuation spring 30 is supported between the actuation piston 28 and a housing support and acts upon the actuation piston 28 in the direction toward the pressure medium chamber 29 assigned to it. The support consists of a projection 41 that extends radially inward into the space between the second piston 3 and the actuation piston 28 and which is part of a sleeve-like wall 26 of the first housing section 1 that is provided with a step 27. In other words, the wall 26 is offset inward toward the space between the two pistons 3 and 28 and has on its free end the projection 41 that extends perpendicularly to the longitudinal axis of pistons 3 and 28. The wall 26 extends in the direction toward the elongated member 45 of the second piston 3. The step 27 serves as a stop for the actuation piston 28 toward the second piston 3.

On the side of the actuation piston 28 facing the second piston 3 is a centrally located elongated member 36, having a head 48 mounted terminally thereon. The head 48 extends into the space 46 of the tubular elongated member 45 of the second piston 3. The thickened part that serves as a head 48 and the elongated member 36 of the actuation piston 28 can be two individual components that are screwed together.

Coaxially to the two pistons 3 and 28, a tubular body 42 serving as an actuation arm is located between them in the first housing section 1. The actuation arm extends into the space limited by the actuation spring 30. The tubular body 42 that serves as the actuation arm is designated as the inner tubular body in the following for the sake of simplicity.

The inner tubular body 42 has a face 43 extending radially and perpendicularly from the central axes of inner tubular body 42 and actuation piston 28. A face 43 is located on the end of inner tubular body 42 closest second piston 3 and extends radially outward from inner tubular body 42. An angular component designed as outer tubular body 40 extends perpendicularly from the outer end of the face 43 and runs essentially parallel to the longitudinal axis of the actuation piston 28, extending toward the actuation piston 28. Outer tubular body 40 surrounds the actuation spring 30 and the support 26 for the actuation spring 30 on a portion of its axial extension. An alternative embodiment of the device utilizes a plate-shaped body for the recessed face 43. A third embodiment utilizes arm-like components that extend outward instead of a circular face 43.

While outer tubular body 40 can be constructed as a tubular body, as already described, it can also consist of one or more arm-like parts. If the part of the actuation arm that works together with the actuation piston 28 or a portion of the actuation piston 28 directly is designed as a tubular body, it is to be arranged so that it extends into the space limited by the actuation spring 30 in order to obtain a space saving.

The free end of the inner tubular body 42 extending into the central space of actuation spring 30 has a rounded projection 38 that is rounded on the inner side and extends inwardly toward the longitudinal axis of the elongated member 45 of the second piston 3. The tubular elongated member 45 of the second piston 3 extends into the inner tubular body 42 and is dimensioned in its axial extension so that its free front face facing the actuation piston 28 lies on thrust piece 32. Thrust piece 32 is located on the end of elongated member 45 which engages the inner surface of rounded projection 38.

The head 48 of the actuation piston 28 extends into the inner tubular body 42 and dips into space 46 of the tubular elongated member 45 of the second piston 3. This forms a trailing connection between the actuation piston 28 and the actuation arm formed by head 48 slidably engaging space 46 located within inner tubular body 42 of the actuation arm. Additional spring 31 is supported on the side of the actuation piston 28 facing the second piston 3 and acts on the inner tubular body 42 such that it is biased away from actuation piston 28.

Additional spring 31 may optionally be supported on a housing projection and act on another zone of the actuation arm. For example, additional spring 31 might extend from face 43 of the actuation arm to a seat adjacent to the illustrated seat on actuation piston 28 in FIG. 2.

A quick-release device 34 sealed with a sealing ring 33 and extending into the pressure medium chamber 29 assigned to the actuation piston 28 is supported in a stepped recess 35 of the wall of the first housing section 1. The quick-release device is situated centrally to the actuation piston 28 and is in working connection with it. The quick release allows first piston 28 to be forced against actuation spring 30, releasing the brake. This produces the same effect as if pressure medium chamber 29 were pressurized.

The outer tubular body 40 is connected flexibly through two joints 47 that consist of bearing journals on the outer shell of the outer tubular body 40. The joints 47 are located opposite each other and each rotatably mount one end of a moment arm 25 that is part of the brake linkage. The two moment arms 25, only one of which is shown in the drawing, are parallel to each other, congruent and have a spacing from each other which is determined by the outside diameter of the outer tubular body 40.

A second housing section 5 is flanged perpendicularly to the longitudinal axis of the first housing section 1. Its inner space is connected with the inner space of the first housing section 1.

The two moment arms 25 are rotatably connected with outer tubular body 40 and extend into the second housing section 5. The two moment arms 25 are pivotably supported at their ends located in the second housing section 5 by a joint 18. A passage opening 19 is provided in one wall of the second housing section 5, crosswise to the longitudinal direction of the moment arm 25, through which brake actuating element 23 passes.

The brake actuating element 23 extending into the second housing section 5 is flexibly connected with the moment arm 25 by means of joints 24 located opposite each other on the moment arm 25. The joints 24 on the moment arm 25 connecting the brake actuating element 23 with the moment arm 25 are located between the joints 47 and 18 located on the ends of the two moment arms 25 facing away from each other.

The exterior section 21 of the brake actuating element 23 located outside of the second housing section 5 is connected with a brake caliper 51. The brake caliper 51 has two parallel brake moment arms 20 and 8 and a connecting rod 15 that connects these brake moment arms 20 and 8 with each other through the joints 16 and 9. One of the brake moment arms 20 is supported with its one end on a joint 22 of the brake actuating element 21, 23 and with its other end it is connected through a joint 14 with a brake shoe 13.

The other brake moment arm 8 is supported with its one end on a joint 7 of a bearing block 6 connected with the second housing section 5 and which is fastened on the second housing section 5 on the side of the latter facing away from the brake actuating element 23 and is connected with its other end through a joint 10 with a second brake shoe 11. A brake disk 12 is provided between the two brake shoes 13 and 11.

Figure 1:
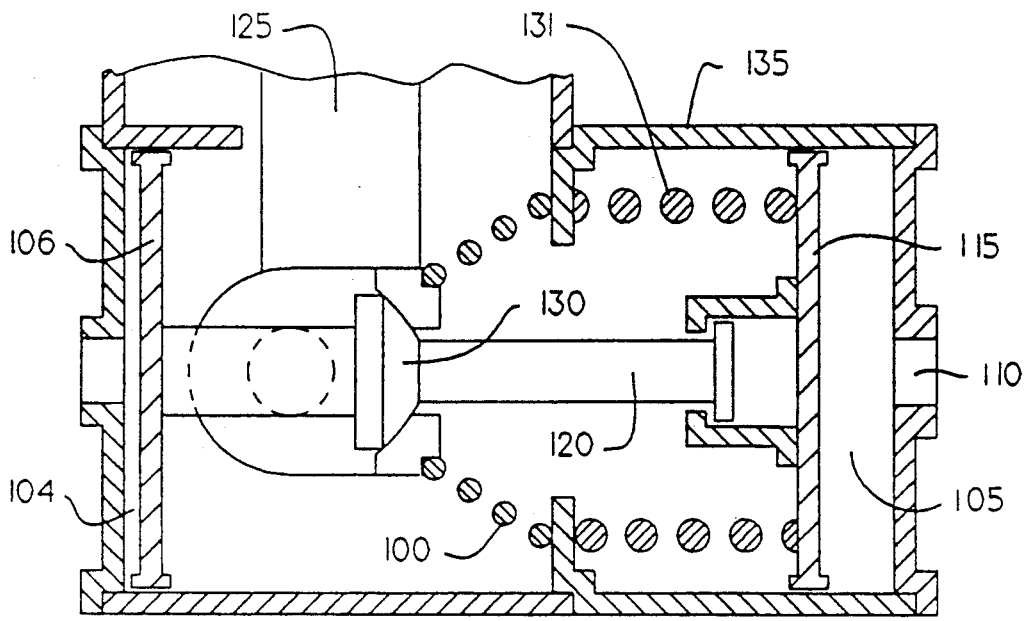
FIG. 1 is a sectional view of a prior art actuation device.
Figure 3:
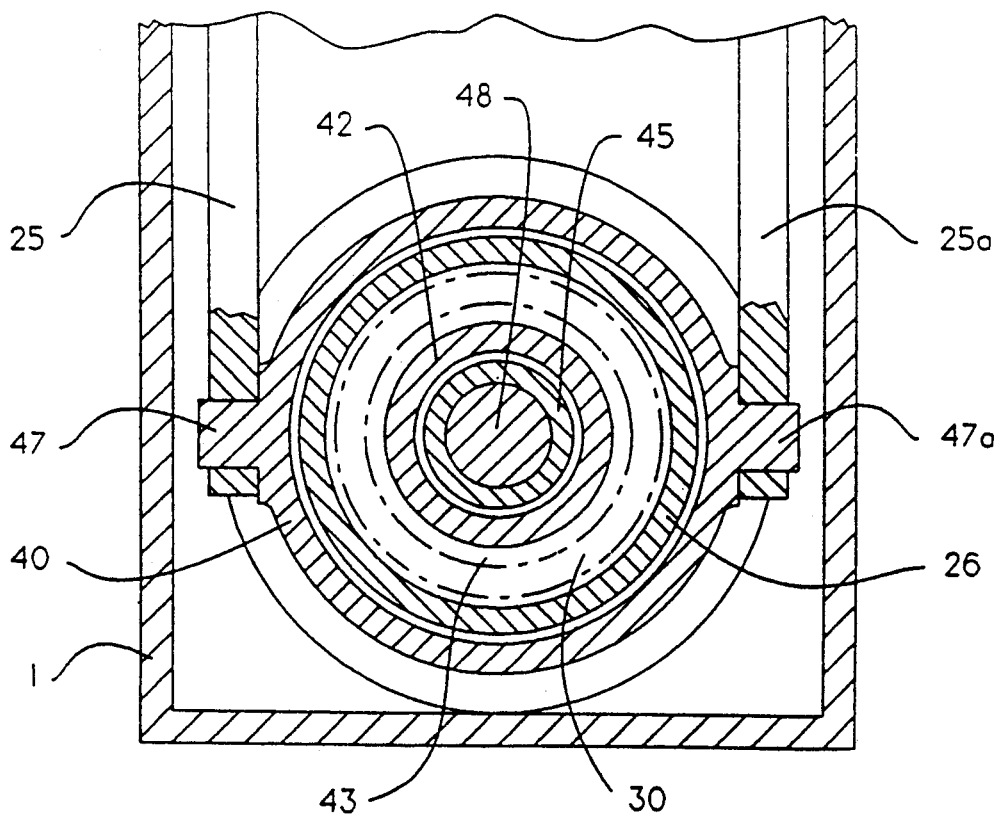
FIG. 3 is a sectional view, taken along line A-B of FIG. 2.

FIG. 3 shows a section through the part of the first housing section 1 having the actuation arm and the actuation spring as well as the two pistons along the line A-B according to FIG. 2.

The actuation arm consisting of the outer tubular body 40, the face 43 and the inner tubular body 42 is shown in FIG. 3 in the housing section 1. The tubular elongated member 45 of the second piston, in which the head 48 of the elongated member 36 of the actuation piston 28 rests, is depicted coaxially to the inner tubular body 42 in its inner space.

The actuation spring 30 is located in the space that is limited by the outer tubular body 40, the face 43 and the inner tubular body 42. Two bearing journals 47 and 47a are provided opposite each other on the outer shell of the outer tubular body 40. These journals form the bearing sites for the moment arms 25 and 25a with bearing eyes provided on the ends of the moment arms 25 and 25a.

As is clear from FIG. 3, the actuation spring 30 is not surrounded directly by the outer tubular body 40 but the actuation spring 30 is enclosed by the sleeve-like support 26 for the actuation spring 30, which in turn is surrounded by the outer tubular body 40.

The function of the braking device described above is elucidated in greater detail in the following with the aid of FIGS. 2 and 3. It is assumed for the purposes of this description that this braking device is operated with compressed air.

As shown in FIG. 2, the pressure medium chamber 2 limited by the second piston 3 and the pressure medium chamber 29 limited by the actuation piston 28 are pressureless. The actuation piston 28 has been brought to its present position by an aeration process preceding a deaeration process of the pressure medium chamber 29, and has tensioned the actuation spring 30. By means of the quick-release device 34, the actuation piston 28 is kept tensioned on the stop 27 and thus the actuation spring 30 is also kept tensioned. The brake is in the released position as shown. This demonstrates the action of the quick release feature.

If compressed air or other pressurized fluid is introduced into the pressure medium chamber 2 assigned to the second piston 3 and into the pressure medium chamber 29 assigned to the actuation piston 28, the position of the actuation piston 28 remains unchanged.

The air actuated-spring release function or service brake function of the device is illustrated as follows. The second piston 3 is shifted to the right, as shown in FIG. 2, by the force of the pressure building up in the pressure medium chamber 2. The tubular body 42 is also moved against the force of the second spring 31 by the tubular elongated member 45 of the second piston 3 and the thrust piece 32, which lies on the rounded projection 38 of the inner tubular body 42. The head 48 located on the elongated member 36 of the actuation piston 28 is thereby separated from the inner surface of the thrust piece 32. Due to the relative movement between the second piston 3 and the actuation piston 28, the elongated member 36 of the actuation piston 28 dips further into the space 46 of the tubular prolongation 45 of the second piston 3.

The moment arms 25 and 25a are connected at one end through the joints 47 with the outer tubular body 40, and are swung counterclockwise, as shown in FIG. 2, around the joints 18 provided on the other ends of the moment arms 25 and 25a opposite these ends of the moment arms 25 and 25a. The brake actuating element 23 is rotatably connected through joints 24 with the moment arms 25 and 25a, and is moved as shown in FIG. 2 to the right, away from the second housing section 5.

The brake moment arms 20 and 8 of the brake caliper 51 are moved in this process with their brake shoes 13 and 11 by the brake actuating element 23 on the brake disk 12 and come to rest on the latter, by which a braking is effected.

If the brake is to be spring released as a part of this function, the pressure medium chamber 2 assigned to the second piston 3 and the pressure medium chamber 29 assigned to the actuation piston 28 are deaerated. The actuation arm is moved to the left, as shown in FIG. 2, away from the actuation piston 28, by the force of the second spring 31. The second piston 3 is also shifted to the left, away from the actuation piston 28, by the actuation arm by means of the rounded projection 38 located on the inner tubular body 42, the thrust piece 32 and the tubular elongated member 45 of the second piston 3. The thrust piece 32 again comes to rest on the head 48 of the elongated member 36 of the actuation piston 28.

The moment arms 25 and 25a connected with the outer tubular body 40 through the joints 47 are swung clockwise, as shown in FIG. 2, around the joints 18. The brake actuating element 23 is thus moved by the moment arms 25 and 25a toward the second housing section 5 and the brake caliper 51 is thus released.

In the processes described above, the position of the actuation piston 28 remains unchanged. The actuation spring 30 remains tensioned.

If the braking device is to be brought into the braking state by the spring applied-air release function, the quick-release device 34 is brought into its release position. The actuation piston 28 is shifted to the right, away from the second piston 3, by the force of the actuation spring 30.

The actuation arm is entrained by the actuation piston 28 by means of the trailing connection connecting the actuation piston 28 with the elongated member 45. The head 48 of the actuation piston 28 engages the inner surface of the thrust piece 32, urging the outer surface of thrust piece 42 rightwardly, as shown in FIG. 2, against rounded projection 38 of the inner tubular body 42. The moment arms 25 and 25a connected with the outer tubular body 40 through the joints 47 are swung counterclockwise, as shown in FIG. 2, around the joints 18.

The brake actuating element 23 is moved away from the second housing section 5 by the moment arms 25 and 25a and the brake caliper 51 connected with the brake actuating element 21, 23 is actuated so that the brake shoes 13 and 11 come to rest on the brake disk 12.

If the braking device is to be again brought into the released position, the pressure medium chamber 29 assigned to the actuation piston 28 is pressurized with compressed air.

Through the force of the pressure building up in this pressure medium chamber 29, the actuation piston 28 is shifted to the left, as shown in FIG. 2, toward the second piston 3. The actuation spring 30 thus becomes tensioned. Through the force of the second spring 31, the actuation arm is also moved to the left, as shown in FIG. 3, toward the second piston 3, far enough so that the thrust piece 32 lying on the rounded projection 38 of the inner tubular body 42 comes to rest on the front face of the tubular elongated member 45 of the second piston 3.

The moment arms 25 and 25a, which are rotatably connected with the outer tubular body 40, are swung clockwise, as shown in FIG. 2, around the joints 18, whereby the brake actuating element 23 connected with the brake caliper 51 is moved toward the left wall of the second housing section 5. The brake caliper 51 releases the brake disk 12.

If the pressure medium chamber 2 assigned to the second piston 3 and the pressure medium chamber 29 assigned to the actuation piston 28 are simultaneously aerated, the second piston 3 and the actuation piston 28 are moved toward each other. The brake caliper 51 thus goes into the braking position, but is held in this position only by the force acting on the second piston 3, since the actuation piston 28 is in its brake-release position actuation spring 30 tensioned.

The actuation arm can, as shown in the drawing, have an inner tubular body 42 and a face 43 that connects the inner tubular body 42 with the outer tubular body 40. It may, however, also consist of a tubular body 40 that surrounds the actuation spring 30 and its support. This may be acted upon directly by the second piston 3 in the direction of brake actuation and may also be moved by a trailing connection between the actuation piston 28 and the second piston 3 in the direction of brake actuation. This occurs in the case where the second piston 3 is entrained through the trailing connection during a movement of the actuation piston 28 by means of the force of the actuation spring 30, comes to rest on the tubular body 40 and entrains the latter in the direction of brake actuation.

Figure 4:
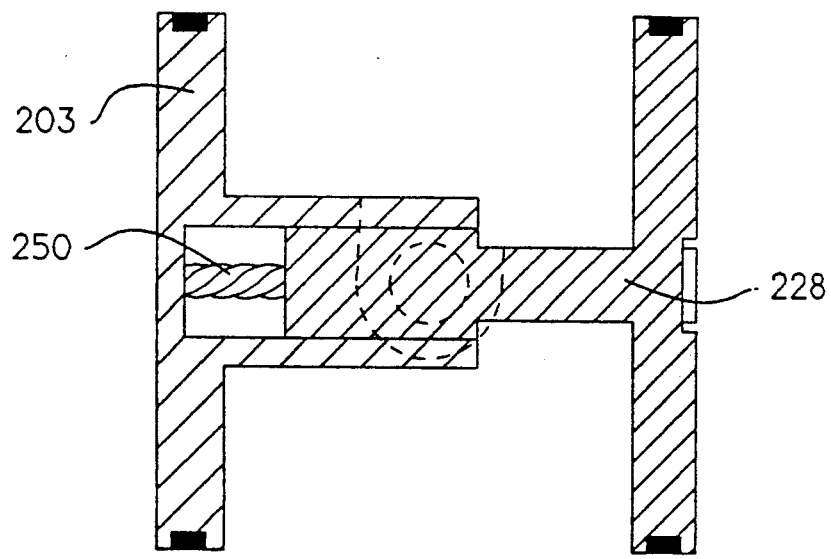
FIG. 4 is a partial sectional view of an actuation piston 228 and a second piston 203 interconnected by a flexible traction element 250 as used in one embodiment.

The trailing connection may further comprise two stops, where one stop is located on the actuation arm and one stop is located on the actuation piston 28. It may also consist of one flexible traction element such as 250 shown in FIG. 4 that is fastened on the actuation piston 28 and on a component connected with the actuation arm. The flexible trailing connection cable connection can also be utilized between the sides of the second piston 3 and the actuation piston 28 and thus connect these two pistons together. In this case, the actuation arm or only the tubular body 40 serving as the actuation arm is entrained in the direction of brake actuation through the trailing connection and the second piston 3 when the actuation piston 28 moves in the direction of brake actuation.

The braking device may also be designed as a simple actuation brake cylinder. In such a case, the arrangement of the additional piston designated as the second piston 3 is eliminated.

While we have described a present preferred embodiment of the invention, it is to be distinctly understood that the invention is not limited thereto but may be otherwise embodied and practiced within the scope of the following claims.

We claim:

1. A braking device of the type having a cylinder with an actuation piston acted upon by a pressure medium from a pressure medium chamber against the force of a resilient actuation means having two ends, the resilient actuation means engaging a support with one end and engaging the piston with the other end, the resilient actuation means engaging the piston on a side opposite the pressure medium chamber, an actuation arm in working connection with a brake linkage, the piston and a component connected with the piston, the actuation arm having at least one bearing site for a moment arm of the brake linkage, the longitudinal axis of which runs perpendicular to the longitudinal axis of the piston, the device comprising:

a) an actuation element having at least one projection that runs generally perpendicular to the longitudinal axis of the piston and is located on the side of the support facing away from the resilient actuation means;

b) a second projection having an angled portion that runs generally parallel to the longitudinal axis of the piston and extends toward the piston, the angled portion being essentially parallel to the longitudinal axis of the resilient actuation means and located outside thereof; and c) a bearing for the moment arm of the brake linkage located on the angled portion adjacent the resilient actuation means.

2. A braking device as described in claim 1, wherein the projection of the actuation element is designed as a plate-like body.

3. A braking device as described in claim 1, wherein a portion of the actuation element engages at least a portion of the piston, the actuation element being designed as a tubular body extending into a space limited by the resilient actuation means.

4. A braking device as described in claim 3, wherein the tubular body further comprises a head on one end facing the piston, and the piston further comprises an elongated member extending outwardly therefrom running in the direction of the longitudinal axis of the piston and extending into the tubular body such that the actuation element is entrained in the same direction when a movement of the piston is effected by the resilient actuation means, the head adapted to engage a stop surface located on the elongated member of the piston.

5. A braking device as described in claim 1, wherein the projections of the actuation element are designed as a recessed component.

6. A braking device as described in claim 5, wherein the angled portion of the projection of the actuation element is designed as a tubular body.

7. A braking device as described in claim 6, further comprising an additional piston located opposite the actuation piston, the additional piston movable by a pressure medium in an additional pressure medium chamber toward the actuation piston, the actuation piston and the additional piston arranged with respect to each other so that the resilient actuation means, the support and the actuation arm are located between the sides of the actuation piston and of the additional piston that face each other, the additional piston further comprising a tubular elongated member that extends toward the actuation piston, the tubular elongated member of the additional piston and an elongated member of the actuation piston arranged with respect to each other and dimensioned such that the elongated member of the actuation piston extends into the tubular elongated member of the additional piston, the tubular body of the actuation element, the elongated member of the additional piston and the elongated member of the actuation piston arranged coaxially to each other, wherein the tubular body surrounds the two elongated members on a portion of their axial extension, the elongated member of the additional piston dimensioned in its axial extension and arranged such that movement of the additional piston toward the actuation piston is terminated by a stop associated with the tubular body and entrains the actuation arm in the direction of movement of the additional piston.

8. A braking device as described in claim 7, further comprising an additional resilient element that acts on the actuation element in a direction toward the additional piston.

9. A braking device as described in claim 8, wherein the actuation element further comprises at least one bearing site on an outer shell of its angled portion and at least one bearing provided for a rotatable connection with a moment arm in working connection with a portion of the brake linkage.

10. A braking device as described in claim 9, wherein the surface of the tubular body of the actuation element that is engageable with a head located on the elongated member of the actuation piston is located between the actuation piston and the actuation arm and is designed as a trailing connection.

11. A braking device as described in claim 10, wherein the head provided on the elongated member of the actuation piston serves as the trailing connection, such that movement of the actuation piston toward the pressure medium chamber assigned thereto entrains the additional piston by the actuation piston, and the actuation element is moved by means of the additional piston in the same direction of movement as the actuation piston and the additional piston.

12. A braking device as described in claim 11, wherein the trailing connection is a traction element interconnecting the actuation piston and the additional piston.

* * * * *